United States Patent
Li et al.

(10) Patent No.: US 10,515,627 B2
(45) Date of Patent: Dec. 24, 2019

(54) METHOD AND APPARATUS OF BUILDING ACOUSTIC FEATURE EXTRACTING MODEL, AND ACOUSTIC FEATURE EXTRACTING METHOD AND APPARATUS

(71) Applicant: BAIDU ONLINE NETWORK TECHNOLOGY (BEIJING) CO., LTD., Beijing (CN)

(72) Inventors: Chao Li, Beijing (CN); Xiaokong Ma, Beijing (CN); Bing Jiang, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 4 days.

(21) Appl. No.: 15/980,208

(22) Filed: May 15, 2018

(65) Prior Publication Data
US 2018/0336889 A1     Nov. 22, 2018

(30) Foreign Application Priority Data
May 19, 2017   (CN) .......................... 2017 1 0361210

(51) Int. Cl.
*G10L 15/00*     (2013.01)
*G10L 15/16*     (2006.01)
(Continued)

(52) U.S. Cl.
CPC .............. *G10L 15/16* (2013.01); *G10L 15/02* (2013.01); *G10L 15/063* (2013.01); *G10L 15/22* (2013.01); *G10L 17/005* (2013.01); *G10L 17/06* (2013.01)

(58) Field of Classification Search
USPC ................................................. 704/246–250
See application file for complete search history.

(56) References Cited

U.S. PATENT DOCUMENTS 9,401,148 B2 *   7/2016   Lei ........................... G10L 17/18
9,824,692 B1 *  11/2017   Khoury .................... G10L 17/08
(Continued)

OTHER PUBLICATIONS

Snyder et al. "Deep Neural Network-based Speaker Embeddings for End-to-end Speaker Verification". IEEE Spoken Language Technology Workshop, Dec. 13-16, 2016, San Diego, USA. (Year: 2016).*

(Continued)

*Primary Examiner* — Jesse S Pullias
(74) *Attorney, Agent, or Firm* — Brooks Kushman PC

(57) ABSTRACT

A method and apparatus of building an acoustic feature extracting model, and an acoustic feature extracting method and apparatus. The method of building an acoustic feature extracting model comprises: considering first acoustic features extracted respectively from speech data corresponding to user identifiers as training data; using the training data to train a deep neural network to obtain an acoustic feature extracting model; wherein a target of training the deep neural network is to maximize similarity between the same user's second acoustic features and minimize similarity between different users' second acoustic features. The acoustic feature extracting model according to the present disclosure can self-learn optimal acoustic features that achieves a training target. As compared with a conventional acoustic feature extracting manner with a preset feature type and transformation manner, the acoustic feature extracting manner of the present disclosure achieves better flexibility and higher accuracy.

15 Claims, 6 Drawing Sheets

(51) Int. Cl.
*G10L 15/02* (2006.01)
*G10L 15/22* (2006.01)
*G10L 17/00* (2013.01)
*G10L 17/06* (2013.01)
*G10L 15/06* (2013.01)

(56) References Cited

U.S. PATENT DOCUMENTS

| | | | |
|---|---|---|---|
| 10,008,209 B1* | 6/2018 | Qian | G10L 17/18 |
| 2014/0214417 A1* | 7/2014 | Wang | G10L 17/18 |
| | | | 704/232 |
| 2015/0112684 A1* | 4/2015 | Scheffer | G10L 17/14 |
| | | | 704/257 |

OTHER PUBLICATIONS

Schroff et al. "FaceNet: A Unified Embedding for Face Recognition and Clustering". IEEE Conference on Computer Vision and Pattern Recognition, Boston, MA, USA, Jun. 7-12, 2015 (Year: 2015).*

* cited by examiner

METHOD AND APPARATUS OF BUILDING ACOUSTIC FEATURE EXTRACTING MODEL, AND ACOUSTIC FEATURE EXTRACTING METHOD AND APPARATUS

The present application claims the priority of Chinese Patent Application No. 2017103612107, filed on May 19, 2017, with the title of "Method and apparatus of building acoustic feature extracting model, and acoustic feature extracting method and apparatus". The disclosure of the above applications is incorporated herein by reference in its entirety.

FIELD OF THE DISCLOSURE

The present disclosure relates to the technical field of computer application, and particularly to a method and apparatus of building an acoustic feature extracting model, and an acoustic feature extracting method and apparatus.

BACKGROUND OF THE DISCLOSURE

As artificial intelligence develops constantly, speech interaction has become one of the most natural interaction manners and spreads increasingly. Sound recognition technology draws people's more and more attention. In speech recognition technologies, extraction of acoustic features is a kernel technique and it may be applied to user recognition, verification, classification or the like.

According to a current acoustic feature extracting manner, speech data is transformed in a preset manner mainly according to a preset feature type to extract features of a corresponding type therefrom. This acoustic feature extracting manner relies on the setting of the feature type and the setting of the transformation manner to a very large extent, and exhibits lower accuracy and flexibility.

SUMMARY OF THE DISCLOSURE

The present disclosure provides a method and apparatus of building an acoustic feature extracting model, an acoustic feature extracting method and apparatus, a device and a computer storage medium, to improve accuracy and flexibility of the extracted acoustic features.

Specific technical solutions are as follows:

The present disclosure provides a method of building an acoustic feature extracting model, the method comprising:
considering first acoustic features extracted respectively from speech data corresponding to user identifiers as training data;
using the training data to train a deep neural network to obtain an acoustic feature extracting model;
wherein a target of training the deep neural network is to maximize similarity between the same user's second acoustic features and minimize similarity between different users' second acoustic features.

According to a preferred embodiment of the present disclosure, the first acoustic features comprise FBank64 acoustic features.

According to a preferred embodiment of the present disclosure, the deep neural network comprises a convolutional neural network CNN, a residual convolutional neural network ResCNN or a Gated Recurrent Unit GRU.

According to a preferred embodiment of the present disclosure, using the training data to train a deep neural network to obtain an acoustic feature extracting model comprises:
using a deep neural network to learn first acoustic features of respective speech data, and outputting second acoustic features of respective speech data;
using the second acoustic features of respective speech data to calculate triplet loss, and using the triplet loss to tune parameters of the deep neural network to minimize the triplet loss;
wherein the triplet loss reflects a state of difference between similarity between the second acoustic features of different users and similarity between the second acoustic features of the same user.

According to a preferred embodiment of the present disclosure, the using a deep neural network to learn the first acoustic features of respective speech data, and outputting the second acoustic features of respective speech data comprises:
using the deep neural network to learn the first acoustic features of respective speech data and outputting second acoustic features at a frame level;
performing pooling and sentence standardization processing for frame-level second acoustic features, and outputting sentence-level second acoustic features;
the second acoustic features of respective speech data used upon calculating the triplet loss are sentence-level second acoustic features of respective speech data.

The present disclosure further provides an acoustic feature extracting method, wherein the method comprises:
extracting first acoustic features of to-be-processed speech data;
inputting the first acoustic features into the acoustic feature extracting model, to obtain second acoustic features of the to-be-processed speech data;
wherein the acoustic feature extracting model is pre-built by using the above-mentioned method of building the acoustic feature extracting model.

According to a preferred embodiment of the present disclosure, the method further comprises:
using the second acoustic features of the to-be-processed speech data to register a voiceprint model of a user identifier corresponding to the to-be-processed speech data; or
matching the second acoustic features of the to-be-processed speech data with already-registered voiceprint models of user identifiers, to determine the user identifier corresponding to the to-be-processed speech data.

The present disclosure further provides an apparatus of building an acoustic feature extracting model, the apparatus comprising:
a data obtaining unit configured to consider first acoustic features extracted respectively from speech data corresponding to user identifiers as training data;
a model training unit configured to use the training data to train a deep neural network to obtain an acoustic feature extracting model, wherein a target of training the deep neural network is to maximize similarity between the same user's second acoustic features and minimize similarity between different users' second acoustic features.

According to a preferred embodiment of the present disclosure, the first acoustic features comprise FBank64 acoustic features.

According to a preferred embodiment of the present disclosure, the deep neural network comprises a convolutional neural network CNN, a residual convolutional neural network ResCNN or a Gated Recurrent Unit GRU.

According to a preferred embodiment of the present disclosure, the model training unit is specifically configured to:
use a deep neural network to learn first acoustic features of respective speech data, and output second acoustic features of respective speech data;
use the second acoustic features of respective speech data to calculate triplet loss, and use the triplet loss to tune parameters of the deep neural network to minimize the triplet loss;
wherein the triplet loss reflects a state of difference between similarity between the second acoustic features of different users and similarity between the second acoustic features of the same user.

According to a preferred embodiment of the present disclosure, the model training unit, upon using a deep neural network to learn first acoustic features of respective speech data, and outputting second acoustic features of respective speech data, specifically performs: using the deep neural network to learn the first acoustic features of respective speech data and outputting second acoustic features at a frame level; performing pooling and sentence standardization processing for frame-level second acoustic features, and outputting sentence-level second acoustic features;
the second acoustic features of respective speech data used by the model training unit upon calculating the triplet loss are sentence-level second acoustic features of respective speech data.

The present disclosure further provides an acoustic feature extracting apparatus, wherein the apparatus comprises:
a pre-processing unit configured to extract first acoustic features of to-be-processed speech data;
a feature extracting unit configured to input the first acoustic features into an acoustic feature extracting model, to obtain second acoustic features of the to-be-processed speech data;
wherein the acoustic feature extracting model is pre-built by using the above-mentioned apparatus of building the acoustic feature extracting model.

According to a preferred embodiment of the present disclosure, the apparatus further comprises:
a voiceprint registration unit configured to use the second acoustic features of the to-be-processed speech data to register a voiceprint model of a user identifier corresponding to the to-be-processed speech data; or,
a voiceprint matching unit configured to match the second acoustic features of the to-be-processed speech data with already-registered voiceprint models of user identifiers, to determine the user identifier corresponding to the to-be-processed speech data.

The present disclosure provides a device, comprising:
a memory including one or more programs,
one or more processors coupled to the memory and executing said one or more programs, to implement operations performed in the above-mentioned method.

The present disclosure further provides a computer storage medium encoded with a computer program, the computer program, when executed by one or more computers, enabling said one or more computers to implement operations performed in the above-mentioned method.

As can be seen from the above technical solutions, the present disclosure aims to maximize similarity between the same user's second acoustic features and minimize similarity between different users' second acoustic features based on the neural network, and train to obtain the acoustic feature extracting model. That is to say, the acoustic feature extracting model according to the present disclosure can self-learn optimal acoustic features that achieves a training target. As compared with the conventional acoustic feature extracting manner with a preset feature type and transformation manner, the acoustic feature extracting manner of the present disclosure achieves better flexibility and higher accuracy.

DETAILED DESCRIPTION OF PREFERRED EMBODIMENTS

Figure 1:
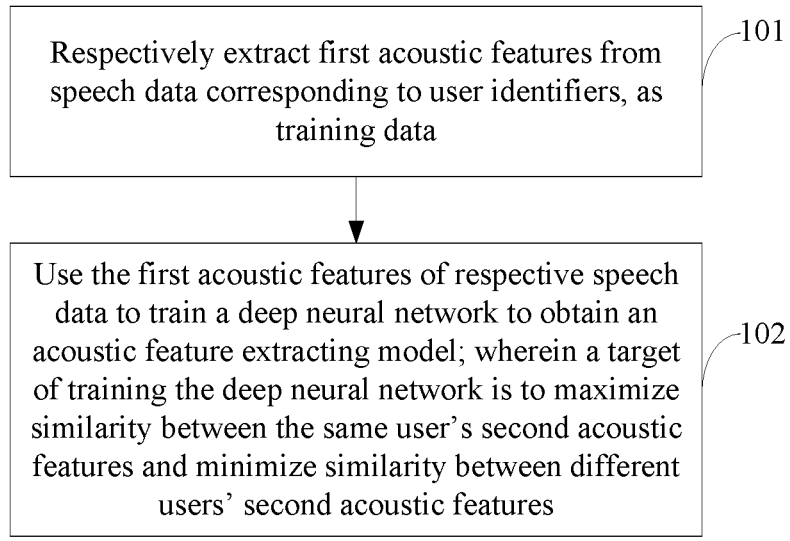
FIG. 1 is a flow chart of a method of building an acoustic feature extracting model according to an embodiment of the present disclosure.

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

A core idea of the present disclosure lies in extracting a high-level acoustic feature of speech data based on a deep neural network. A target of training the deep neural network is to maximize similarity between the same user's high-level acoustic features and minimize similarity between different users' high-level acoustic features, thereby obtaining the acoustic feature extracting model. The acoustic feature extracting model is used to extract high-level acoustic features of speech data.

In addition, when the acoustic feature extracting model is trained, it is necessary to first perform extraction of low-level acoustic features for the speech data in the training data, namely, perform pre-processing. The low-level acoustic features have a coarser granularity than the high-level acoustic features, and contain coarser information quantity; on the contrary, the high-level acoustic features obtained after processing by the acoustic feature extracting model have a finer granularity than the low-level acoustic features, contain finer information quantity, and are adapted to build a voiceprint model to establish the user's voiceprint. In embodiments of the present disclosure, to distinguish the two kinds of acoustic features, the low-level acoustic features obtained after pre-processing the speech data are called first acoustic features; the high-level acoustic features obtained after processing the low-level acoustic feature with the acoustic feature extracting model are called second acoustic features.

The present disclosure includes two phases: a phase of building the acoustic feature extracting model and a phase of using the acoustic feature extracting model to extract acoustic features. The two phases are independent on each other. The phase of building of the acoustic feature extracting model may be a pre-executed phase, but it is also possible to constantly update the acoustic feature extracting model in the subsequent procedure. The two phases are described in detail in conjunction with embodiments.

FIG. 1 is a flow chart of a method of building an acoustic feature extracting model according to an embodiment of the present disclosure. As shown in FIG. 1, the method may comprise the following steps:

In 101, first acoustic features are extracted respectively from speech data corresponding to user identifiers and considered as training data.

It is feasible to pre-collect a known user's speech data, and upon selecting training data, impose some requirements for quality of these speech data, e.g., select speech data with a better definition, and then for example delete speech data with a too long or too short length.

The collected speech data is first pre-processed to extract therefrom the first acoustic features of respective speech data. As stated above, the first acoustic features are the low-level acoustic features. In the embodiment of the present disclosure, an FBank (Mel-scale Filter Bank) features may be used as the first acoustic features. For example, the FBank features of the speech data are extracted with 25 ms as a frame and with 10 ms as a step length. However, the present disclosure is not limited to the FBank features and other features may be used as the first acoustic features.

As such, the first acoustic features corresponding to respective user identifiers may be obtained to constitute the training data. The present disclosure does not limit the specific types of the user identifiers. The user identifiers may be any type of identifiers so long as the users can be distinguished. The training data may include the first acoustic features of different speech data corresponding to the same user, first acoustic features of speech data corresponding to different users, and the like. Each first acoustic feature in the training data has a corresponding user identifier as a tag.

In 102, a deep neural network is trained using the first acoustic features of respective speech data to obtain an acoustic feature extracting model, wherein a target of training the deep neural network is to maximize similarity between the same user's second acoustic features and minimize similarity between different users' second acoustic features.

In this step, the deep neural network may be first used to learn the first acoustic features of respective speech data, and output the second acoustic features of respective speech data. Then, the second acoustic features of respective speech data are used to calculate triplet loss, and the triplet loss is fed back to the deep neural network to tune parameters of the deep neural network to minimize the triplet loss.

Figure 2:
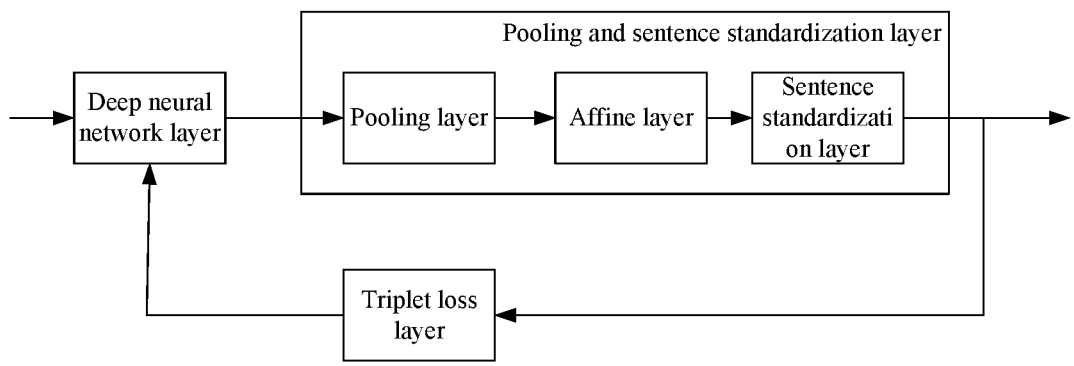
FIG. 2 is a structural schematic diagram of an acoustic feature extracting model according to an embodiment of the present disclosure.

The structure of the acoustic feature extracting model is introduced to facilitate the understanding of the acoustic feature extracting model according to the embodiment of the present disclosure. As shown in FIG. 2, the acoustic feature extracting model may comprise a deep neural network layer, a pooling and sentence standardization layer and a triplet loss layer.

The deep neural network may employ CNN, GRU (Gated Recurrent Unit) and the like. Certainly, other types of deep neural networks such as RNN and LSTM may be employed. Since CNN can more effectively reduce spectrum changes and reflect spectrum correlation in the acoustic features as compared with RNN and LSTM, CNN is preferably selected as the deep neural network in the embodiment of the present disclosure.

However, although the deep neural network has an excellent learning capability, it is trained more difficultly. The accuracy undesirably drops in the case of certain depth. To solve the problem, the present disclosure may, based on CNN, uses but is not limited to ResNet (Residual Net)-type CNN, or uses GRU.

First, the ResNet-type CNN is introduced first.

Figure 3:
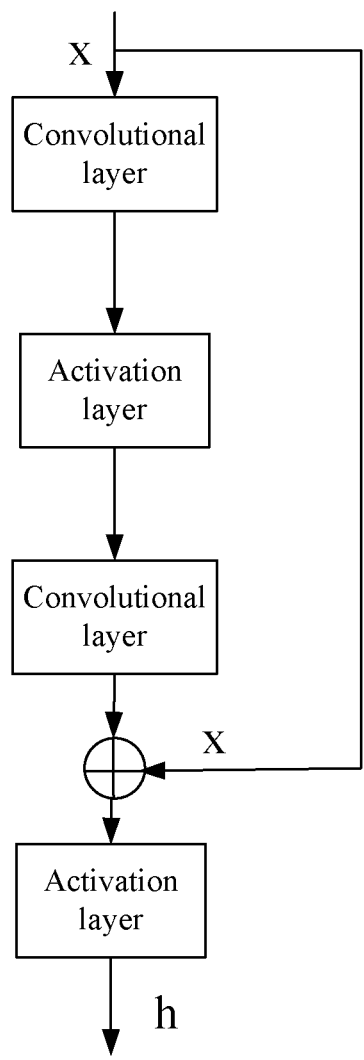
FIG. 3 is a structural schematic diagram of stacked residual blocks according to an embodiment of the present disclosure.

ResNet may be used to simplify the training of CNN. ResNet includes several stacked ResBlocks which each comprise a direct connection between low-level output and high-level input. As shown in FIG. 3, each ResBlock may be defined as:

$$h = F(x, W_i) + x$$

Wherein x and h respectively represent input and output of ResBlocks. F represents a mapping function of a non-linear layer of the stack.

As shown in FIG. 3, the ResBlock may comprise two convolutional layers and two activation layers, wherein the two convolutional layers may comprise for example 3×3 filters and 1×1 strides. Each ResBlock comprises the same structure, and jump connection is the same mapping for x. If the number of channels increases, a convolutional layer (e.g., having 5×5 filters and 2×2 strides) may be used. Hence, frequency dimensionality keeps constant in the convolutional layer for ever. It is found after research that speech recognition is not sensitive to the strides on temporal dimensionality. In the embodiment of the present disclosure, the following ReLU (Rectified Linear Units) function may be used as non-linear processing of all activation layers:

$$\sigma(x) = \min\{\max\{x, 0\}, 20\}$$

GRU is introduced below.

As compared with LSTM, GRU exhibits a quicker training speed and a smaller diffusion degree. In the embodiment of the present disclosure, the deep neural network layer may employ a plurality of GRUs. For example, each GRU may comprise a convolutional layer with 5×5 filters and 2×2 strides, can reduce the dimensionality of time domain and frequency domain and thereby allow for a quicker calculation speed of GRU. Immediately adjacent to the convolutional layer are three forward GRU layers which have 1024 units and are cyclic in time dimensionality. For example, ReLU may be used in the GRU for activation.

The pooling and sentence standardization layer is close to the deep neural network layer. The pooling and sentence standardization layer is used to perform pooling and sentence standardization processing for the second acoustic features at a frame level output by the deep neural network, to thereby obtain the second acoustic features at a sentence level.

Specifically, as shown in FIG. 2, the pooling and sentence standardization layer may comprise a pooling layer, an affine layer and a sentence standardization layer.

The pooling layer is used to convert input of the frame level to a representation at a sentence level, namely, average the second acoustic features at the frame level to obtain the second acoustic features at the sentence level.

The output h' of the pooling layer may employ the following formula:

$$h' = \frac{1}{T}\sum_{t=0}^{T-1} x'(t)$$

Wherein T is the number of frames contained by the sentence, and x'(t) is input of the pooling layer.

Through the processing of the pooling layer, the acoustic feature extracting model according to the embodiment of the present disclosure can process sentences of different time lengths and applies to text-independent cases.

The affine layer projects the second acoustic features at the sentence level to a preset dimensionality, for example to 512 dimensions.

A length standardization layer fine-tunes the length of the sentence-level second acoustic features output by the affine layer to allow the modulus to be 1.

In the embodiment of the present disclosure, the triplet loss layer uses triplet loss to perform feedback training for the deep neural network layer to maximize similarity between the second acoustic features of the same user, and minimize similarity between the second acoustic features of different users.

The triplet loss layer may employ three samples as input: anchor sample including a user's sentence-level second acoustic features; a positive sample including the second acoustic features at another sentence level of the same user as the anchor sample; a negative sample including the second acoustic features at a sentence level of a different use from the anchor sample. The above samples constitute a triplet.

The triplet loss layer performs feedback for the deep neural network layer to enable a cosine similarity between the anchor sample and the positive sample (similarity between samples in the embodiment of the present disclosure is represented by cosine similarity, but other similarity calculation manners are not excluded) to be larger than cosine similarity between the anchor sample and the negative sample. Formally, $$s_i^{ap} - \alpha > s_i^{an}$$

Wherein $s_i^{ap}$ is cosine similarity between the anchor sample a and the positive sample p in the triplet i. $s_i^{an}$ is cosine similarity between the anchor sample a and the positive sample n in the triplet i. The training aims to find the smallest edge α in these similarities. That is, the triplet loss is calculated to reflect a state of difference between similarity between the second acoustic features of different users and similarity between the second acoustic features of the same user. For example, a function L for calculating the triplet loss may be:

$$L = \sum_{i=0}^{N} [s_i^{an} - s_i^{ap} + \alpha]_+$$

wherein N is the number of triplets, and an operator $[x]_+ = \max(x, 0)$.

The triplet loss obtained from calculation is fed back to the deep neural network layer to constantly fine-tune the parameter of the deep neural network layer, thereby gradually training the deep neural network, and finally minimizing the triplet loss obtained by calculating with the extracted second acoustic features. After the training ends, the acoustic feature extracting model is obtained and the training procedure of this time ends.

Figure 4:
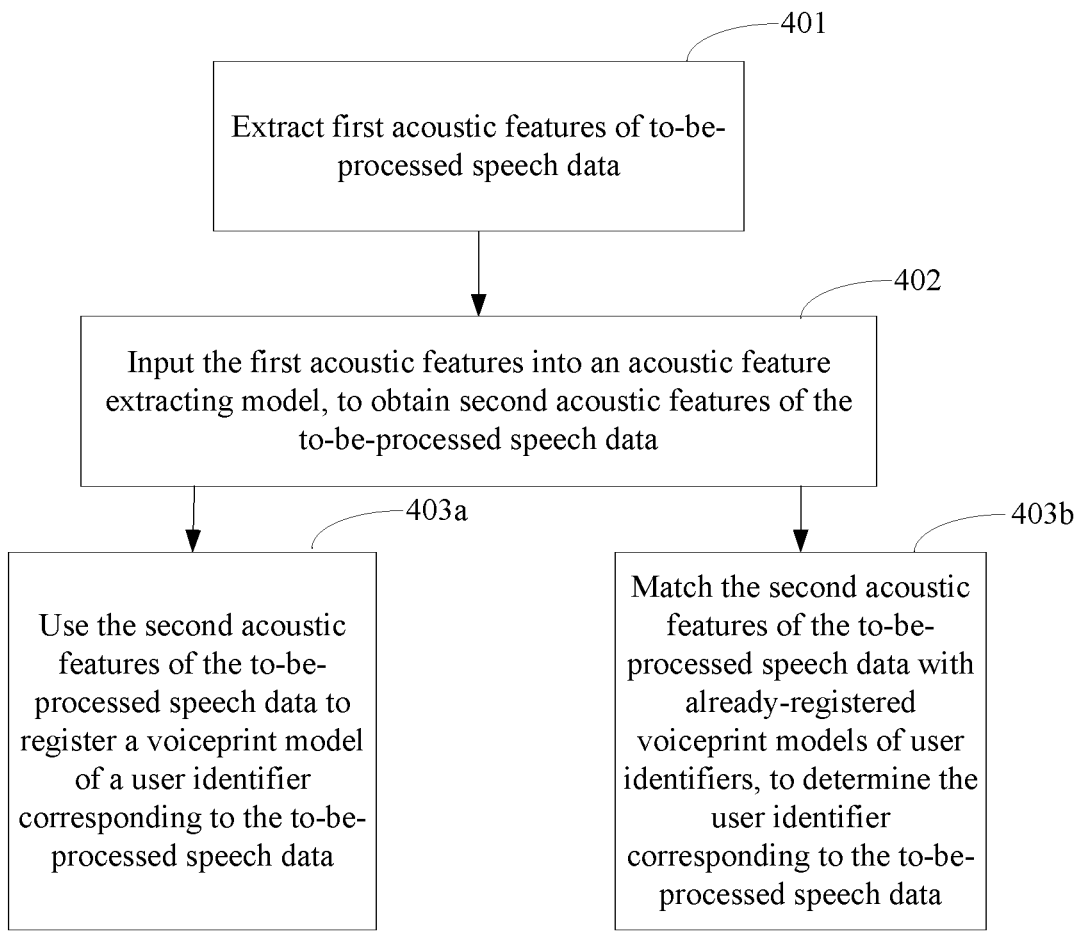
FIG. 4 is a flow chart of an acoustic feature extracting method according to an embodiment of the present disclosure.

FIG. 4 is a flow chart of an acoustic feature extracting method according to an embodiment of the present disclosure. The flow is based on the acoustic feature extracting model built in the embodiment shown in FIG. 1. As shown in FIG. 4, the method may comprise the following steps:

In 401 are extracted the first acoustic features of the to-be-processed speech data.

This step is pre-processing the to-be-processed speech data, namely, extracting therefrom the first acoustic features which are the low-level acoustic features. The first acoustic features extracted here are consistent with the first acoustic features extracted in step 101 in the embodiment shown in FIG. 1 in type and manner and will not be detailed any more here.

In 402, the extracted first acoustic features are input into the acoustic feature extracting model, to obtain the second acoustic features of the to-be-processed speech data.

Since the acoustic feature extracting model obtained by pre-training has already finished self-learning from the first acoustic features to the second acoustic features from the training data, the acoustic feature extracting model can output the second acoustic features of the to-be-processed speech data after the first acoustic features of the to-be-processed speech data extracted in step 401 are input into the acoustic feature extracting model. The second acoustic features may be sentence-level high-level acoustic features.

After the second acoustic features of the to-be-processed speech data are obtained, the second acoustic feature may be used to perform the processing of subsequent application. In 403a, the second acoustic feature of the to-be-processed speech data is used to register a voiceprint model of the user identifier corresponding to the to-be-processed speech data. Or in 403b, the second acoustic features of the to-be-processed speech data are matched with the already-registered voiceprint models of the user identifiers, to determine the user identifier corresponding to the to-be-processed speech data.

In 403a, if the user identifier corresponding to the to-be-processed speech data is known, the extracted second acoustic features may be used to register the voiceprint model corresponding to the user identifier. Upon registration of the voiceprint model, the extracted second acoustic features may be processed as voiceprint information which is stored in the voiceprint model. One or more second acoustic features corresponding to the user identifier may be used to register the acoustic model. A specific registration procedure is not specifically limited in the present disclosure.

In 403b, if the user identifier corresponding to the to-be-processed speech data is unknown, it is feasible to use the extracted second acoustic features to match with the already-registered voiceprint models in a voiceprint model repository, for example, match by calculating similarity between the extracted second acoustic features and the voiceprint models in the voiceprint model repository. If a certain voiceprint model is successfully matched, it may be determined that the to-be-processed speech data corresponds to the user identifier corresponding to the successfully matched voiceprint model.

The above 403a and 403b are two application manners of the extracted second acoustic features of the speech data according to the embodiment of the present disclosure. Certainly, other applications may be performed in addition to the two application manners and are not exhausted in the present disclosure.

The above method may be applied to a speech recognition system. A subject for executing the method may be a corresponding apparatus. The apparatus may be application located at a user equipment, or a function unit such as a plug-in or Software Development Kit (SDK) in an application located in the user equipment. The user equipment may include but is not limited to a smart mobile terminal, a smart household device, a network device, a wearable device, a smart medical device, a PC (personal computer) and the like. The smart mobile device may include for example a mobile phone, a tablet computer, a notable computer, a PDA (personal digital assistant), an Internet vehicle and the like. The smart household device may include a smart electrical appliance such as a smart TV set, a smart air conditioner, a smart water heater, a smart refrigerator, a smart air purifier and the like. The smart household device may further comprise a smart door lock, a smart electrical lamp, a smart camera and the like. The network device may comprise a switchboard, a wireless AP, a server and the like. The wearable device may comprise for example a smart watch, smart glasses, a smart bracelet, a virtual reality device, an augmented reality device, a mixed reality device (namely, a device that may support virtual reality and augmented reality). The smart medical device may comprise for example a smart thermometer, a smart blood pressure meter, a smart blood sugar meter and the like.

Figure 5:
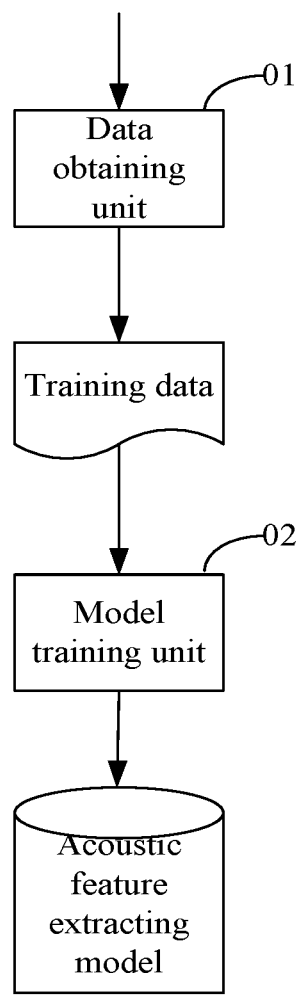
FIG. 5 is a structural diagram of an apparatus of building an acoustic feature extracting model according to an embodiment of the present disclosure.

FIG. 5 is a structural diagram of an apparatus of building an acoustic feature extracting model according to an embodiment of the present disclosure. The apparatus may be used to execute operations as shown in FIG. 1. As shown in FIG. 5, the apparatus may comprise a data obtaining unit 01 and a model training unit 02. Main functions of the units are as follows:

The data obtaining unit 01 is configured to consider first acoustic features extracted respectively from speech data corresponding to user identifiers as training data.

It is feasible to pre-collect a known user's speech data, and upon selecting training data, impose some requirements for quality of these speech data, e.g., select speech data with a better definition, and then for example delete speech data with a too long or too short length.

In the embodiment of the present disclosure, FBank features may be used as the first acoustic features. For example, the FBank features of the speech data are extracted with 25 ms as a frame and with 10 ms as a step length. However, the present disclosure is not limited to the FBank features and other features may be used as the first acoustic features.

The model training unit 02 is configured to use training data to train a deep neural network to obtain an acoustic feature extracting model, wherein a target of training the deep neural network is to maximize similarity between the same user's second acoustic features and minimize similarity between different users' second acoustic features.

Preferably, the deep neural network employed in the embodiment of the present disclosure may comprise CNN, ResCNN or GRU. Depictions about ResCNN and GRU may be found in the depictions in the method embodiments, and will not be detailed any more.

Specifically, the model training unit 02 may first use the deep neural network to learn the first acoustic features of respective speech data, and output the second acoustic features of respective speech data; then use the second acoustic features of respective speech data to calculate triplet loss, and feed the triplet loss back to the deep neural network to tune parameters of the deep neural network to minimize the triplet loss; wherein the triplet loss reflects a state of difference between similarity between the second acoustic features of different users and similarity between the second acoustic features of the same user.

More specifically, the model training unit 02, upon learning the first acoustic features of respective speech data and outputting the second acoustic features of respective speech data, may specifically perform: using the deep neural network to learn the first acoustic features of respective speech data and outputting second acoustic features at a frame level; performing pooling and sentence standardization processing for frame-level second acoustic features, and outputting sentence-level second acoustic features. At this time, the second acoustic features of respective speech data used by the model training unit 02 upon calculating the triplet loss are sentence-level second acoustic features of respective speech data.

Specific architecture of the acoustic feature extracting model and specific processing performed by layers of the architecture may be found from relevant depictions in the method embodiments and will not be detailed any more here.

Figure 6:
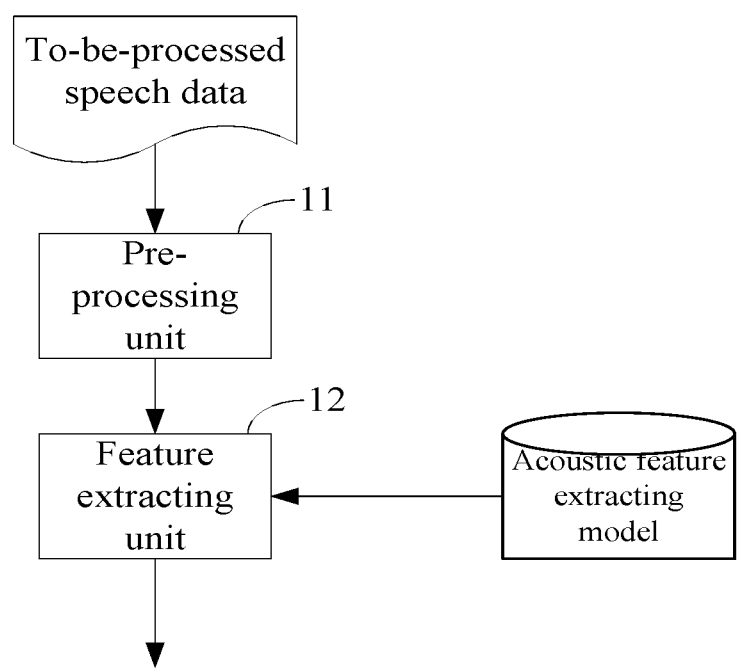
FIG. 6 is a structural diagram of an acoustic feature extracting apparatus according to an embodiment of the present disclosure.

FIG. 6 is a structural diagram of an acoustic feature extracting apparatus according to an embodiment of the present disclosure. As shown in FIG. 6, the apparatus may comprise a pre-processing unit 11 and a feature extracting unit 12. Main functions of the units are as follows:

The pre-processing unit 11 is configured to extract the first acoustic features of the to-be-processed speech data. The first acoustic features are consistent with the first acoustic features used by the data obtaining unit 01 upon obtaining the training data in FIG. 5 in type and extraction manner. For example, the first acoustic features may employ FBank features.

The feature extracting unit 12 is configured to input the first acoustic features into the acoustic feature extracting model, to obtain the second acoustic features of the to-be-processed speech data.

After the second acoustic features of the to-be-processed speech data are obtained, the second acoustic features may be used to perform the processing of subsequent application. For example, the apparatus may further include:

a voiceprint registration unit (not shown in the figure) configured to use the second acoustic features of the to-be-processed speech data to register a voiceprint model of the user identifier corresponding to the to-be-processed speech data.

Again for example, the apparatus may further comprise:
a voiceprint matching unit (not shown in the figure) configured to match the second acoustic features of the to-be-processed speech data with the already-registered voiceprint models of the user identifiers, to determine the user identifier corresponding to the to-be-processed speech data.

Figure 7:
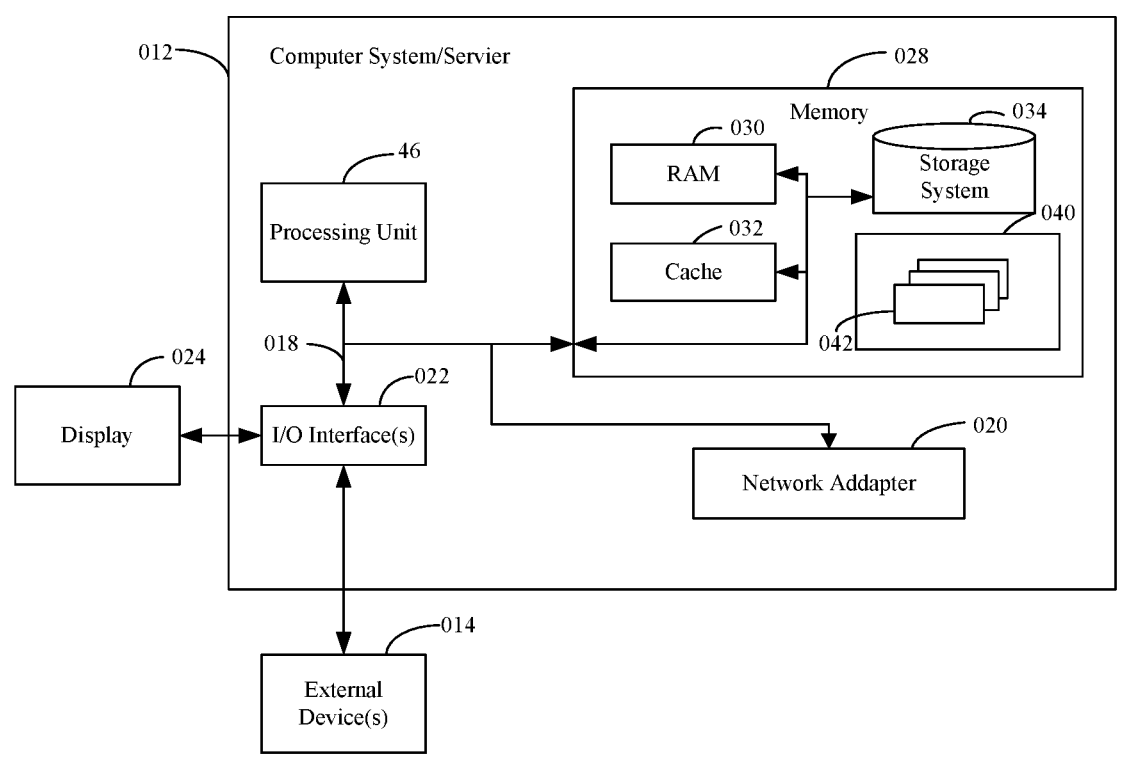
FIG. 7 is a block diagram of a computer system/server according to an embodiment of the present disclosure.

FIG. 7 illustrates a block diagram of an example computer system/server 012 adapted to implement an implementation mode of the present disclosure. The computer system/server 012 shown in FIG. 7 is only an example and should not bring about any limitation to the function and scope of use of the embodiments of the present disclosure.

As shown in FIG. 7, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 7, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implements a method of building an acoustic feature extracting model, which comprises:
considering first acoustic features extracted respectively from speech data corresponding to user identifiers as training data;
using the training data to train a deep neural network to obtain an acoustic feature extracting model;
wherein a target of training the deep neural network is to maximize similarity between the same user's second acoustic features and minimize similarity between different users' second acoustic features.

Again for example, implements an acoustic feature extracting method, comprising:
extracting first acoustic features of to-be-processed speech data;
inputting the first acoustic features into the acoustic feature extracting model, to obtain the second acoustic features of the to-be-processed speech data.

The aforesaid computer program may be arranged in the computer storage medium, namely, the computer storage medium is encoded with a computer program. The computer program, when executed by one or more computers, enables one or more computers to execute the flow of the method and/or operations of the apparatus as shown in the above embodiments of the present disclosure. For example, the flow of the method performed by the one or more processors may comprise:
considering first acoustic features extracted respectively from speech data corresponding to user identifiers as training data;
using the training data to train a deep neural network to obtain an acoustic feature extracting model;
wherein a target of training the deep neural network is to maximize similarity between the same user's second acoustic features and minimize similarity between different users' second acoustic features.

Again for example, the flow of the method performed by the one or more processors may comprise:
extracting first acoustic features of to-be-processed speech data;
inputting the first acoustic features into the acoustic feature extracting model, to obtain the second acoustic features of the to-be-processed speech data.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It can be seen from the above depictions that the method, apparatus, device and computer storage device according to the present disclosure may have the following advantages:

1) The acoustic feature extracting model according to the present disclosure can self-learn optimal acoustic features that achieves a training target. As compared with the conventional acoustic feature extracting manner with a preset feature type and transformation manner, the acoustic feature extracting manner of the present disclosure achieves better flexibility and higher accuracy.

2) In the present disclosure, ResCNN or GRU type deep neural network is preferably selected to ensure the accuracy of feature extraction and improve the training speed of the deep neural network in the case that a higher-level deep neural network is employed.

3) During the training of the acoustic feature extracting model in the present disclosure, the output of the deep neural network is subjected to the pooling and sentence standardization processing so that that model can perform feature extraction with respect to text-irrelevant speech data very well in addition to performing feature extraction with respect to the text-relevant speech data.

4) It is found after experiments that the present disclosure can better process large-scale speech data and be well adapted to process different languages.

In the embodiments provided by the present disclosure, it should be understood that the revealed method, apparatus and device can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the target of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of building an acoustic feature extracting model, wherein the method comprises:
considering first acoustic features extracted respectively from speech data corresponding to user identifiers as training data; and
using the training data to train a deep neural network to obtain an acoustic feature extracting model;
wherein a target of training the deep neural network is to maximize similarity between the same user's second acoustic features and minimize similarity between different users' second acoustic features,
wherein using the training data to train a deep neural network to obtain an acoustic feature extracting model comprises:
using a deep neural network to learn first acoustic features of respective speech data, and outputting second acoustic features of respective speech data;
using the second acoustic features of respective speech data to calculate triplet loss, and using the triplet loss to tune parameters of the deep neural network to minimize the triplet loss;
wherein the triplet loss reflects a state of difference between similarity between the second acoustic features of different users and similarity between the second acoustic features of the same user, and
wherein the using a deep neural network to learn first acoustic features of respective speech data, and outputting second acoustic features of respective speech data comprises:

using a deep neural network to learn first acoustic features of respective speech data and outputting second acoustic features at a frame level;

performing pooling and sentence standardization processing for frame-level second acoustic features, and outputting sentence-level second acoustic features;

the second acoustic features of respective speech data used upon calculating the triplet loss are sentence-level second acoustic features of respective speech data.

2. The method according to claim 1, wherein the first acoustic features comprise FBank acoustic features.

3. The method according to claim 1, wherein the deep neural network comprises a convolutional neural network CNN, a residual convolutional neural network ResCNN or a Gated Recurrent Unit GRU.

4. The method according to claim 1, wherein the method further comprises:
extracting first acoustic features of to-be-processed speech data;
inputting the first acoustic features into the acoustic feature extracting model, to obtain second acoustic features of the to-be-processed speech data.

5. The method according to claim 4, wherein the method further comprises:
using the second acoustic features of the to-be-processed speech data to register a voiceprint model of a user identifier corresponding to the to-be-processed speech data; or
matching the second acoustic features of the to-be-processed speech data with already-registered voiceprint models of user identifiers, to determine the user identifier corresponding to the to-be-processed speech data.

6. A device, comprising:
a memory including one or more programs,
one or more processors coupled to the memory and executing said one or more programs, to implement the following operation:
considering first acoustic features extracted respectively from speech data corresponding to user identifiers as training data; and
using the training data to train a deep neural network to obtain an acoustic feature extracting model;
wherein a target of training the deep neural network is to maximize similarity between the same user's second acoustic features and minimize similarity between different users' second acoustic features,
wherein using the training data to train a deep neural network to obtain an acoustic feature extracting model comprises:
using a deep neural network to learn first acoustic features of respective speech data, and outputting second acoustic features of respective speech data;
using the second acoustic features of respective speech data to calculate triplet loss, and using the triplet loss to tune parameters of the deep neural network to minimize the triplet loss;
wherein the triplet loss reflects a state of difference between similarity between the second acoustic features of different users and similarity between the second acoustic features of the same user, and
wherein the using a deep neural network to learn first acoustic features of respective speech data, and outputting second acoustic features of respective speech data comprises:
using a deep neural network to learn first acoustic features of respective speech data and outputting second acoustic features at a frame level;
performing pooling and sentence standardization processing for frame-level second acoustic features, and outputting sentence-level second acoustic features;
the second acoustic features of respective speech data used upon calculating the triplet loss are sentence-level second acoustic features of respective speech data.

7. The device according to claim 6, wherein the first acoustic features comprise FBank acoustic features.

8. The device according to claim 6, wherein the deep neural network comprises a convolutional neural network CNN, a residual convolutional neural network ResCNN or a Gated Recurrent Unit GRU.

9. The device according to claim 6, wherein the operation further comprises:
extracting first acoustic features of to-be-processed speech data;
inputting the first acoustic features into the acoustic feature extracting model, to obtain second acoustic features of the to-be-processed speech data.

10. The device according to claim 9, wherein the operation further comprises:
using the second acoustic features of the to-be-processed speech data to register a voiceprint model of a user identifier corresponding to the to-be-processed speech data; or
matching the second acoustic features of the to-be-processed speech data with already-registered voiceprint models of user identifiers, to determine the user identifier corresponding to the to-be-processed speech data.

11. A non-transitory computer storage medium encoded with a computer program, the computer program, when executed by one or more computers, enabling said one or more computers to implement the following operation:
considering first acoustic features extracted respectively from speech data corresponding to user identifiers as training data; and
using the training data to train a deep neural network to obtain an acoustic feature extracting model;
wherein a target of training the deep neural network is to maximize similarity between the same user's second acoustic features and minimize similarity between different users' second acoustic features,
wherein using the training data to train a deep neural network to obtain an acoustic feature extracting model comprises:
using a deep neural network to learn first acoustic features of respective speech data, and outputting second acoustic features of respective speech data;
using the second acoustic features of respective speech data to calculate triplet loss, and using the triplet loss to tune parameters of the deep neural network to minimize the triplet loss;
wherein the triplet loss reflects a state of difference between similarity between the second acoustic features of different users and similarity between the second acoustic features of the same user, and
wherein the using a deep neural network to learn first acoustic features of respective speech data, and outputting second acoustic features of respective speech data comprises:
using a deep neural network to learn first acoustic features of respective speech data and outputting second acoustic features at a frame level;
performing pooling and sentence standardization processing for frame-level second acoustic features, and outputting sentence-level second acoustic features;

the second acoustic features of respective speech data used upon calculating the triplet loss are sentence-level second acoustic features of respective speech data.

12. The non-transitory computer storage medium according to claim 11, wherein the first acoustic features comprise FBank acoustic features.

13. The non-transitory computer storage medium according to claim 11, wherein the deep neural network comprises a convolutional neural network CNN, a residual convolutional neural network ResCNN or a Gated Recurrent Unit GRU.

14. The non-transitory computer storage medium according to claim 11, wherein the operation further comprises:
    extracting first acoustic features of to-be-processed speech data;
    inputting the first acoustic features into the acoustic feature extracting model, to obtain second acoustic features of the to-be-processed speech data.

15. The non-transitory computer storage medium according to claim 14, wherein the operation further comprises:
    using the second acoustic features of the to-be-processed speech data to register a voiceprint model of a user identifier corresponding to the to-be-processed speech data; or matching the second acoustic features of the to-be-processed speech data with already-registered voiceprint models of user identifiers, to determine the user identifier corresponding to the to-be-processed speech data.

\* \* \* \* \*